US006782438B1

United States Patent
Duncan et al.

(10) Patent No.: US 6,782,438 B1
(45) Date of Patent: Aug. 24, 2004

(54) IO SPEED AND LENGTH PROGRAMMABLE WITH BUS POPULATION

(75) Inventors: Samuel H. Duncan, Arlington, MA (US); Dennis Hayes, Littleton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 345 days.

(21) Appl. No.: 09/652,641

(22) Filed: Aug. 31, 2000

(51) Int. Cl.[7] ............................................. G06F 13/00
(52) U.S. Cl. ..................................... 710/104; 710/100
(58) Field of Search ............................ 710/200, 312, 710/300, 104, 302

(56) References Cited

U.S. PATENT DOCUMENTS 5,560,022 A * 9/1996 Dunstan et al. ............. 710/300
6,026,456 A * 2/2000 Ilkbakhar .................... 710/100
6,061,754 A * 5/2000 Cepulis et al. .............. 710/312
6,105,091 A * 8/2000 Long ........................... 710/302
6,134,621 A * 10/2000 Kelly et al. ................. 710/104
6,484,222 B1 * 11/2002 Olson et al. ................. 710/300

OTHER PUBLICATIONS

Variable Duration Microprocessor Clock Generation, IBM Technical Disclosure Bullentin, May 1989.*
Exerpts of PCI specification.
Exerpts of PCI–X specification.

* cited by examiner

Primary Examiner—Tim Vo (57) ABSTRACT

A system and circuitry is described for a programmable PCI/PCI-x bus that accepts PCI and PCI-x controller cards and associated IO devices. The operating speed of the bus is reduced in accordance with the number and speed of the device as prearranged. The speed is to assure that the IO devices and the bus controller are compatible. A mix of PCI and or PCI-x devices can be accommodated by the present invention. Moreover, for high speed devices, the physical length of the bus itself is changed to better accommodate the higher speeds involved.

6 Claims, 6 Drawing Sheets

1 nsec
~0.5 FT

|  | ONE SLOT | TWO SLOTS | THREE SLOTS | FOUR SLOTS | FIVE SLOTS | SIX SLOTS |
|---|---|---|---|---|---|---|
| AT LEAST ONE PCI @ 33 MHz | 33 MHz PCI | 33 MHz PCI | 33 MHz PCI | 33 MHz PCI | 33 MHz PCI | 33 MHz PCI |
| AT LEAST ONE PCI @ 66 MHz | 66 MHz PCI | 66 MHz PCI | 33 MHz PCI | 33 | 33 | 33 |
| AT LEAST PCIX @ 66 MHz | 66 | 66 | 66 | 66 | 50 | 50 |
| AT LEAST PCIX @ 133 MHz | 133 | 100 | 100 | 66 | 50 | 50 |

COR BUS SHORTENED TO THE NUMBER OF IO SLOTS

FIG. 5

| PCIX-TYPE | PCIX 66 | PCIX-FREQ. CAPABILITY |
|---|---|---|
| 0 | 0 | NA (PCT) |
| 0 | 1 | PCIX - 66 MHz |
| 1 | 1 | PCIX - 133 MHz |

| 808 V | PCIX-TYPE(-) | PCIX-66(-) | LOGIC |
|---|---|---|---|
| 0 V | +Vcc | +Vcc | PCI TYPE (IF ANY) |
| +5 V | gnd | gnd | PCI-X 133 MHz |
| 1.5 V (> V@ 812) (< V@ 810) | +Vcc | gnd | PCI-X 66 MHz |
| | gnd | +Vcc | CAN'T EXIST V@ 810 > V@ 812 |

IO SPEED AND LENGTH PROGRAMMABLE WITH BUS POPULATION

RELATED APPLICATIONS

U.S. patent application Ser. No. 09/652,644 entitled ADAPTIVE DATA PREFETCH PREDICTION ALGORITHM;

U.S. patent application Ser. No. 09/653,133 entitled UNIQUE METHOD OF REDUCING LOSSES IN CIRCUITS USING $V^2$ PWM CONTROL;

U.S. patent application Ser. No. 09/653,133 entitled PARTITION FORMATION USING MICROPROCESSORS IN A MULTIPROCESSOR COMPUTER SYSTEM;

U.S. Provisional Patent Application Ser. No. 60/304,167 entitled SYSTEM AND METHOD FOR USING FUNCTION NUMBERS TO INCREASE THE COUNT OF OUTSTANDING SPLIT TRANSACTIONS;

U.S. patent application Ser. No. 09/652,984 entitled SYSTEM AND METHOD FOR PROVIDING FORWARD PROGRESS AND AVOIDING STARVATION AND LIVELOCK IN A MULTIPROCESSOR COMPUTER SYSTEM;

U.S. patent application Ser. No. 09/653,180 entitled ONLINE ADD/REMOVAL OF SERVER MANAGEMENT INFRASTRUCTURE;

U.S. patent application Ser. No. 09/652,494 entitled AUTOMATED BACKPLANE CABLE CONNECTION IDENTIFICATION SYSTEM AND METHOD;

U.S. patent application Ser. No. 09/652,459 entitled CLOCK FORWARDING DATA RECOVERY;

U.S. patent application Ser. No. 09/652,980 entitled CLOCK FORWARD INITIALIZATION AND RESET SIGNALING TECHNIQUE;

U.S. patent application Ser. No. 09/944,515 entitled PASSIVE RELEASE AVOIDANCE TECHNIQUE;

U.S. patent application Ser. No. 09/652,985 entitled COHERENT TRANSLATION LOOK-ASIDE BUFFER;

U.S. patent application Ser. No. 09/652,645 entitled DETERMINISTIC HARDWARE BEHAVIOR BETWEEN MULTIPLE ASYNCHRONOUS CLOCK DOMAINS THROUGH THE NOVEL USE OF A PLL; and U.S. patent application Ser. No. 09/655,171 entitled VIRTUAL TIME OF YEAR CLOCK.

BACKGROUND OF THE INVENTION

1. Field of the Invention

The present invention relates to computer IO busses, and more particularly to base IO hardware platforms driving a variable population of IO devices under a variety of protocols and speeds.

2. Background Information

Figure 1:
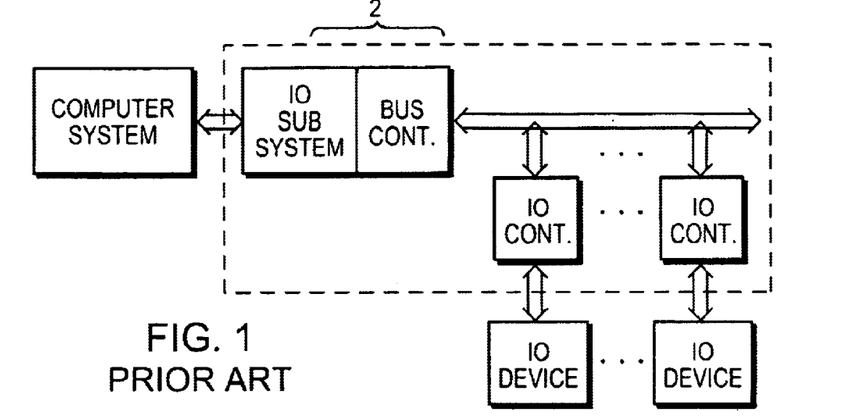
FIG. 1 is schematic block diagram or a prior art system.

Typical computer systems have a number and variety of input/output (IO) devices attached. Depending on the application these IO devices run from the low speed types measured in seconds (e.g., keyboard entries) to high speed types measured in nanoseconds (e.g., optical communications). The different IO devices may be bit serial or parallel, and the IO may conform to one of a number of standard specifications (e.g., PCI, PCI-x, STD, etc.). Some devices might need to be serviced in real time (music, movies). FIG. 1 shows a typical prior art IO system.

Often the applications break into two types, one that requires one or two very high speed IO channels and a few low or moderate speed channels, and a second type that requires a large number of moderate and low speed devices.

On large symmetrical multiprocessor systems where hundreds of 64-bit processors may be running, clock speed are in the GigaHertz (GHz) range and above and these large systems are being applied to applications requiring large numbers of IO devices including very fast devices. The designers of these system were faced with designing an IO sub-system having a standard IO hardware/firmware platform that is flexible enough to service the variety of devices demanded by a wide range of applications.

At the present time, these IO needs are being met in computer systems by their IO platforms providing a few performance plug-in slots and more medium or low performance plug-in slots. These known IO platform systems strike a tradeoff between a few applications requiring a very high IO bandwidth and a larger number requiring low and/or moderate bandwidth. However, in these systems the total number of slots is fixed and the physical length of the IO bus itself is fixed to extend to all the slots. These facts in themselves limit the IO platforms' performance for both the high and the low performance IO devices.

Figures 2A, 2B, 2D:
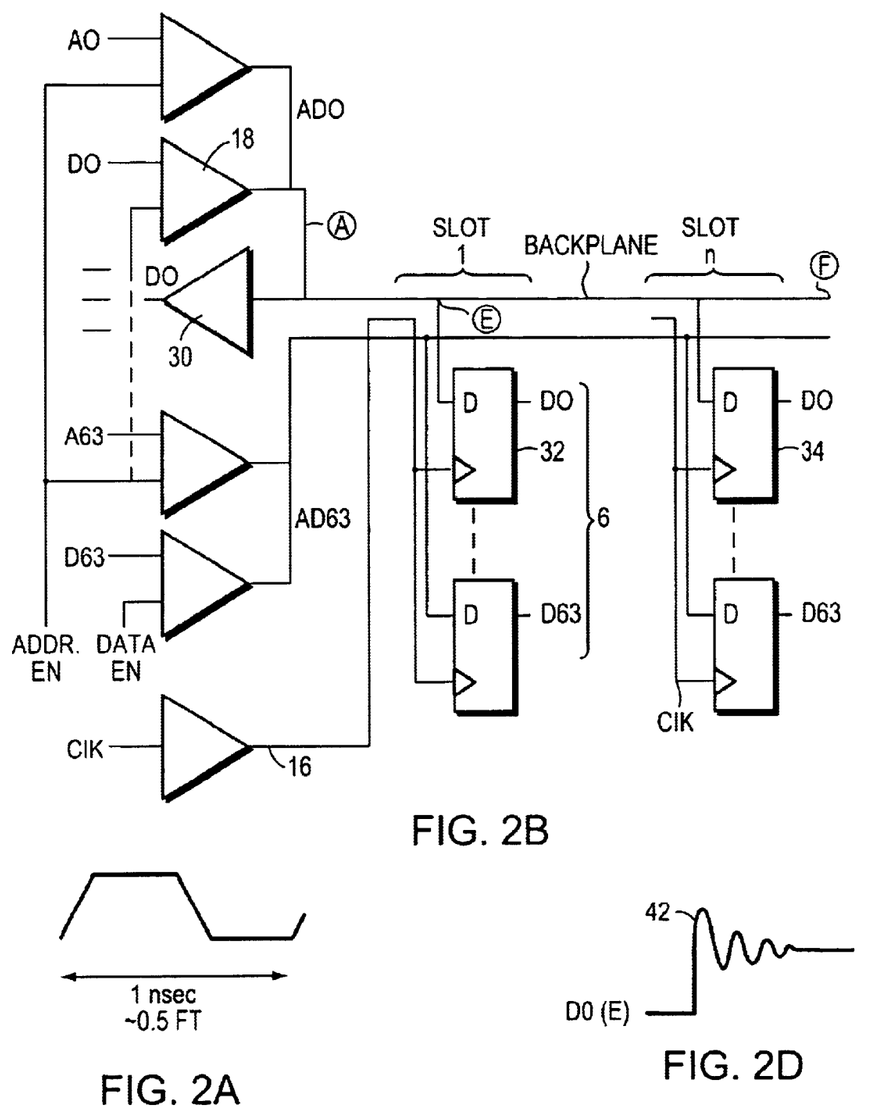
FIG. 2A–2D illustrates and diagrams issues in high speed IO bus design.

FIG. 2A–2D illustrate some of the problems mentioned above. For reference and appreciation of the problems, it is instructive to review what becomes important when GHz speed are used. FIG. 2A shows a typical one GHz clock signal with a period of one nanosecond. The electrical signals along the cable or etched circuit board runs will traverse about six inches in one clock period. In many IO systems and even in large scale integration (LSI) chips distances are measured in inches, so that the transit time of signals on physical runs must be considered when signals are running to and from an IO device controller connected to an IO bus. As discussed below, design of IO systems running in the hundreds of MegaHertz (MHz) speed ranges must be careful of the physical length of the signal runs and the IO device being serviced.

FIG. 2B illustrates the above problems in more detail. In FIG. 2B there are sixty four data signal (D0–D63) that are being delivered to etched runs on a backplane connecting to a number of IO controller slots. In this example, the runs are multiplexed sharing data and address out to the IO devices. In addition, the data paths are bidirectional and for purposes of this discussion the timing and load issues are discussed herein for D0 the data out lines. The general considerations, however, apply for data in, control signals in and out, and for clock signals. Referring to FIG. 2B, when the signals appear on the bus they will be physically routed to one of several IO controllers attached to the bus. One controller 6 may be in slot 1, and the data, here illustrated with one data line D0, is presented eventually (there could be logic involved in the general case) to a data flop 32 or another such storage device, and, after the time delay of the backplane, the same data will be presented to a data flop 34 in the farthest slot n.

Figure 2C:
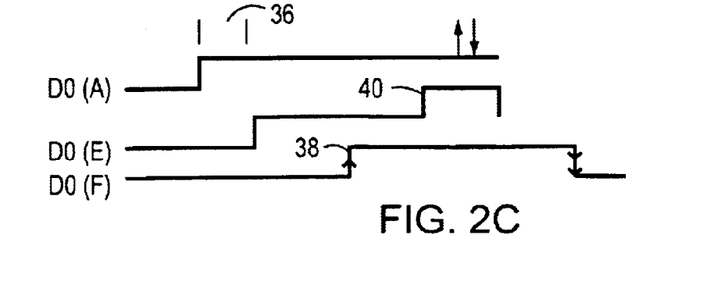

FIG. 2C details the transit delays. The Data Enable places D0 on the backplane at A as shown. D0 appears at E after the time delay determined by the time distance along the backplane 36 from A to E. D0 appears at the data flop 32 that is positioned is as close to the bus as practical. The D0 signal continues travelling down the backplane until point F the end is reached. Regardless of the loads on the bus (assuming high impedance loads and no transmission line terminations) the D0 signal will incur a full position reflection 38 at location F since the bus is open circuited. That reflection will travel back to location E 30 exhibiting an overshoot 40 and finally to the source A where, if the gate 18 presents a low impedance (from a driver), a negative reflection occurs which then travels back down the bus. These signals travel back and forth causing oscillations of a frequency determined from the time length of the backplane bus—a quarter wave length tuned circuit. In a practical embodiment where the backplane length is about one foot (2 nanoseconds) long, the ringing oscillation 42 in FIG. 2D on a step function signal will be of about an eight nanosecond period or one hundred and twenty-five MHz (125 MHz). This is right in the range of IO clock speeds in many practical systems. Since reflection must be reasonable settled on data, address and clock signals before the signal can be reliably latched, the IO performance may be limited in practical system by such ringing. It should be noted that capacitors may be found on the lines which are intended to reduce any such ringing.

As shown in FIG. 2B, the clock signal 16 is designed to exhibit the same delays travelling down the bus as the data, so that the clock (clock forwarding) and the data arrive at about the same time thereby compensating for the bus delay.

Another issue for the IO sub-system design is illustrated in FIG. 2B, where the number and type of IO controllers and devices are not known. Referring back to FIG. 1, it is evident that if the speed of the computer to Bus Controller 2 is known, say one GHz, then the combination of all the IO devices connected to the bus controller cannot sustain more than a one GHz IO speed (buffering may help in some limited special applications). The bus controller can only support a given number of devices depending on the number of such devices and their speeds (and the number of slots). More over, if too many fast devices are attached to the IO bus, the system must run slower in accordance with these IO devices, and the IO devices will have to wait for service.

The low performance is limited in that there are not enough slots for some applications.

There is a need for a flexible IO platform that provides a high speed bus whose speed is not substantially limited by the physical bus length, and wherein the same platform is flexible to accommodate a number of mid and low speed IO devices.

SUMMARY OF THE INVENTION

The above objects and the limitations of the prior art are satisfied by the following programmable IO hardware and method.

The present invention provides switches that are placed along an IO bus adjacent to connectors or sockets or similar means for attaching a device controller to the IO bus. The bus may be preferably embodied as etched printed circuit runs along a backplane, or as wires or cables or similar such embodiments as are known in the art. The switches lengthen or shorten the actual bus length as determined from signals sent out by the processor system to which the IO bus is attached. The processor system is apprised of the location along the bus of and shortens the bus length to accommodate the farthest IO device controller. In a preferred embodiment, the IO device controllers are placed at the nearest (electrically nearest) to the processing system. In this embodiment the number of IO device controllers is made known to or are determined by the processor system, then the processing system system assumes those IO controllers are placed in the nearest IO slots. The processor system shortens the physical length of the bus to those necessary IO slots.

The number, speed and type of IO controller are also made known to or determined by the processor system, whereupon the processor system will determine the speed of the IO bus in order to accommodate the IO controllers. Preferably the number, speed and type are made known to the processing system by use of pins or connections made to IO device controllers or by the initialization process designed for the system. Preferably many IO bus standards provide this capability, or the ability is provided by specially designed hardware and/or software. In a preferred embodiment, the IO speed is operated at the speed of the slowest device attached to the IO bus.

BRIEF DESCRIPTION OF THE DRAWINGS

The invention description below refers to the accompanying drawings, of which.

DETAILED DESCRIPTION OF AN ILLUSTRATIVE EMBODIMENT

Figure 3A:
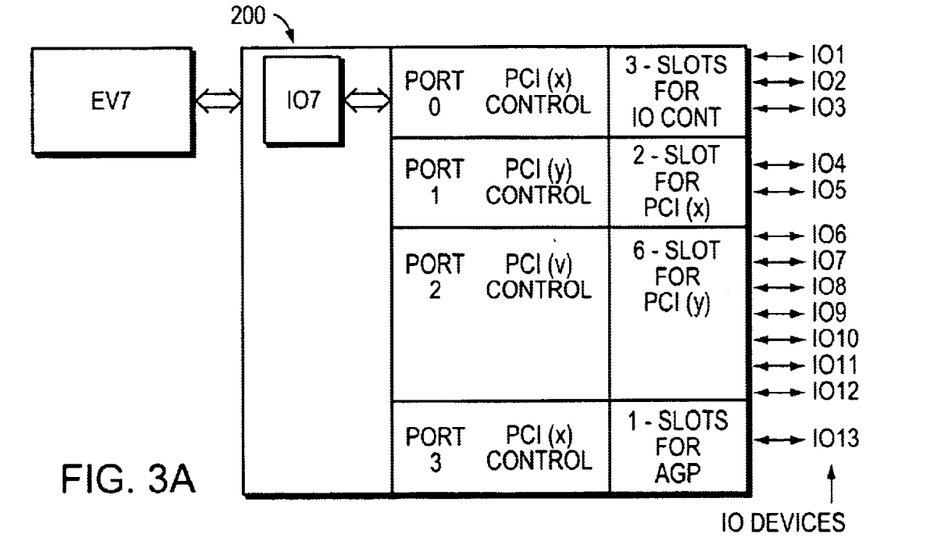
FIG. 3A and 3B are block diagrams of an IO sub-system and its layout in a 19 inch rack drawer, respectively, suitable of use with the present invention.

FIG. 3A is a block diagram of an IO7 which embodies an IO sub-system in accordance with the present invention. In this instance the EV7 is one of a number of mesh interconnected 64-bit Alpha® (Register trademark of Compaq Computer Corporation) processors that form a symmetric multiprocessor system. The IO7 is arranged in a chasis 700 to handle four ports each which can accommodate six IO slots suitable for IO device controllers.

Figure 3B:
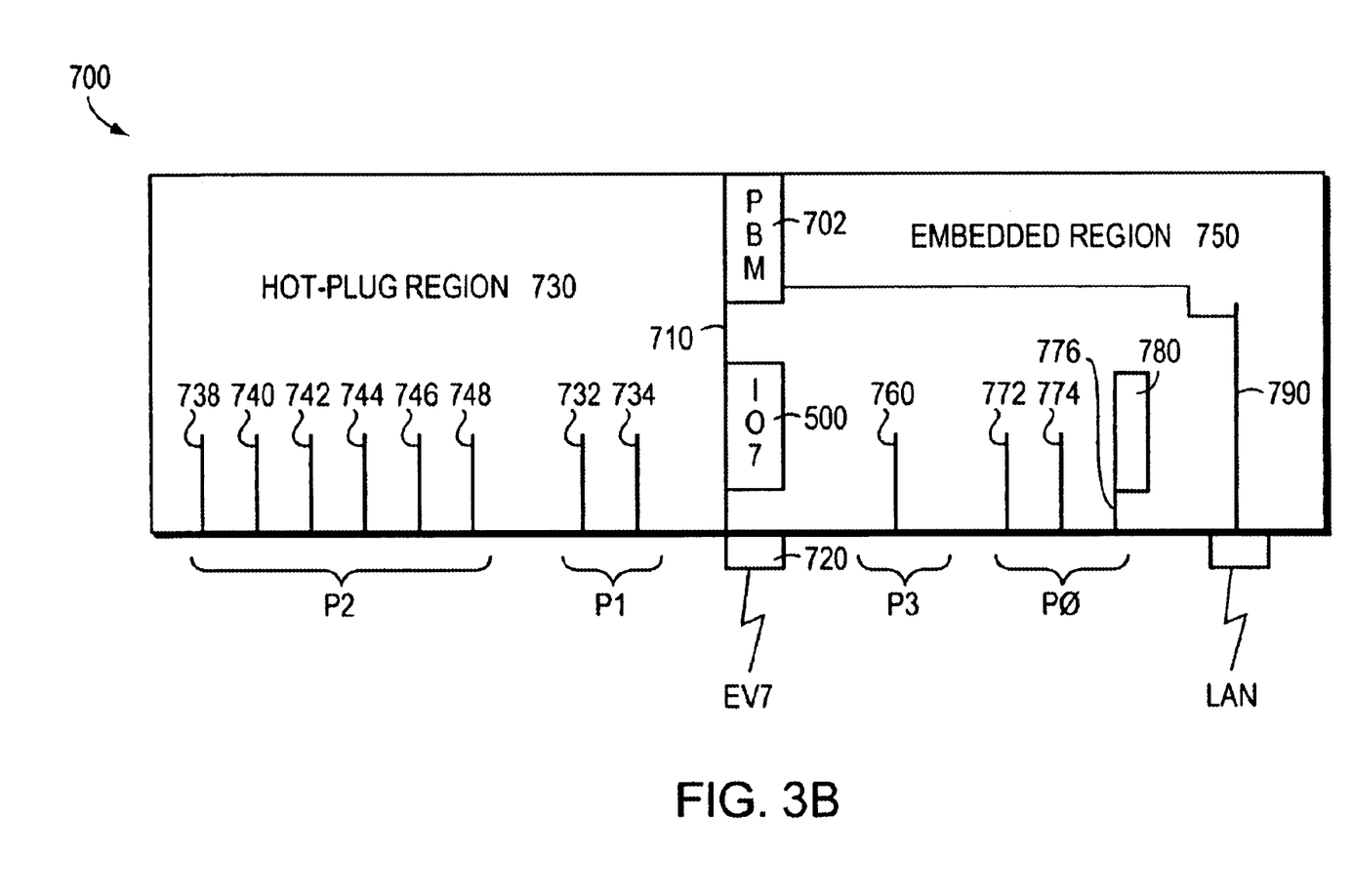

FIG. 3B is a schematic block diagram of an I/O drawer 700 of the SMP system which includes a first I/O riser card 710 containing an IO7 500, a connector 720 coupling the IO7 to the EV7 processor and a plurality of I/O buses. The drawer fits in a standard 19 inch rack. The speed of the I/O buses contained within the I/O drawer is a function of the length and the number of loads of each I/O bus. The I/O drawer is divided into two parts: a hot-plug (card removable with system poer down) region 730 and an embedded (IO commonly in a system) region 750. In the illustrative embodiment, there is a dedicated slot 760 adjacent to the I/O riser card 710 within the embedded region 750 that is dedicated to an accelerated graphics processor (AGP) printed circuit card. Also included within the embedded region 750 are 3 standard, 64-bit PCI card slots 772–776, two of which may be occupied by additional AGP Pro cards. Otherwise, these PCI slots are available for embedded I/O card options. For example, an I/O standard module card 780 may be inserted within one of the PCI slots 772–776.

Each I/O drawer 700 also includes power supplies, fans and storage/load devices (not shown). The I/O standard module card 780 contains an IDE controller for the storage/load devices, along with an SCSI controller for those devices and a universal serial bus that enables keyboard, mouse, CD and similar input/output functions. The embedded region 750 of the I/O drawer is typically pre-configured and not configured for hot-swap operations. In contrast, the hot-plug region 730 includes a plurality of slots adapted to support hot-swap. Specifically, there are 2 ports 732–734 of the hot plug region dedicated to I/O port one (P1 of FIG. 5) and 6 slots 738–748 dedicated to I/O port two (P2 of FIG. 5). Likewise, the dedicated AGP Pro slot 760 comprises port three (P3) and the 3 standard PCI slots 772–776 comprise port zero (P0). The I/O buses in the hot-plug region 730 are configured to support PCI and PCI-x standards operating at 33 MHz, 66 MHz, 100 MHz and/or 133 MHz. Not all slots are capable of supporting all of these operating speeds as discussed later.

Also included within the I/O drawer 700 and coupled adjacent to the IO7 is a PCI backplane manager (PBM 702). The PBM 702 is an integral part of a platform management infrastructure as described further herein. The PBM is coupled to a local area network (e.g., 100 base T Ethernet) by way of another I/O riser board 790 within the I/O drawer. The local area network (LAN) provides an interconnect for the server management platform that includes, in addition to the PBM, a CMM located on each 2P CPU module and an MBM (backplane manager) located in each 8P drawer. Note that the cable coupling the IO7 to the EV7 on a 2P module may be up to 6 meters in length.

One approach to the design of the IO sub-system was the development of the PCI and PCI-x busses and their specifications. PCI stands for Peripheral Controller Interface, and –x is an extension of that bus and specification. Both types of IO can be connected to the bus. This bus has found broad acceptance in the industry, and although the present invention applies generally to IO bus structures in general, the examples next discussed are examples of an IO controller interfacing a number of PCI and PCI-x interfaced devices. The use of such devices and the detailed operation are well known in the art.

Figure 4:
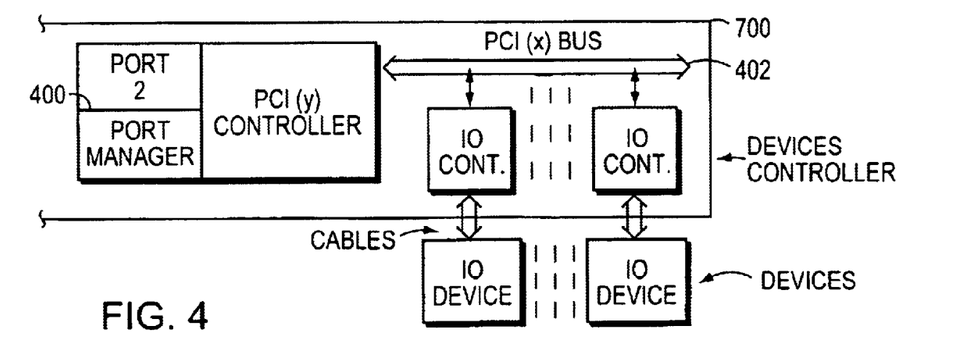
FIG. 4 is a block diagram of the IO sub-system for one port of FIG. 3.
Figure 5:
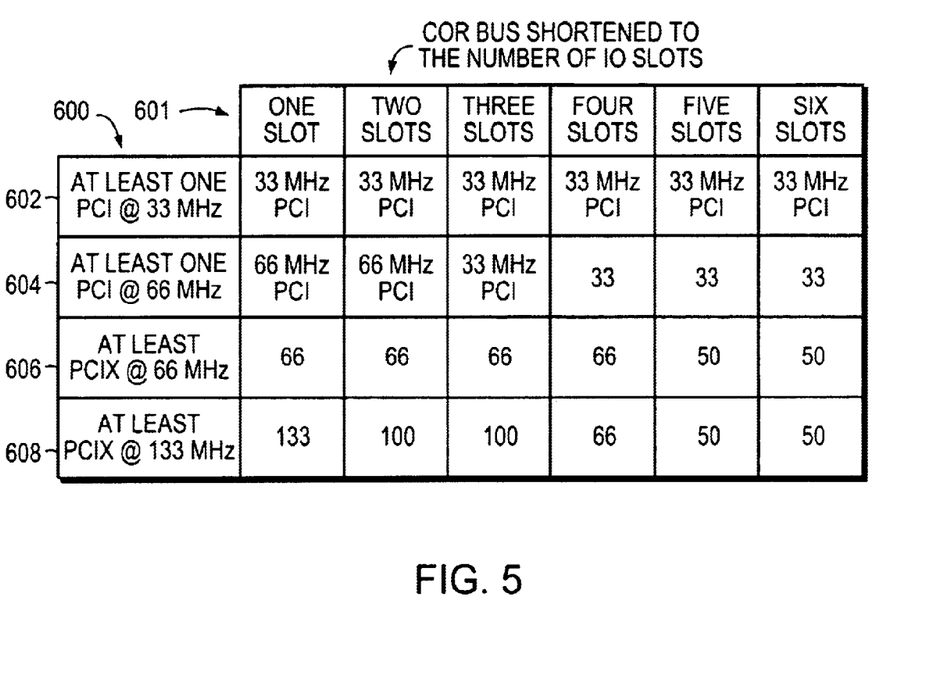
FIG. 5 is table of slots versus IO device speeds.

FIG. 4 is a layout diagram of a single IO port of FIG. 3A. Port P0 has a programmable port manager 400 that incorporates sensing circuitry to determine the types (PCI or PCI-x) of device controllers, and the number of such controllers and their clock speeds that are attached to the bus 402. IO slots are shown in FIG. 4, and here the IO PCI-x port manager 400 reads the population on the bus and a program within the manager adapts to the speeds as shown in FIG. 5. The sensing is discussed later.

The presence and number of PCI device controllers attached to the bus are determined by the port manager 400 reading two pins from each PCI connector on the PCI bus. For example, with reference to FIG. 4, if there are six slots containing six PCI device controllers there will be six PCI PRST#1 signals returned to the port manager indicating that there are six PCI device controllers on the PCI bus. The speeds of the device controllers (and the devices) are made known to the port manager by another standard pin on the PCI bus—the M66EN pin from each slot. If M66EN is pulled low that device controller operates at 33 MHz, and, if M66EN is unconnected or high, the device controller operates at 66 MHz. As discussed below with reference to FIG. 5, when one device operates at 33 MHz, the port will operate at 33 MHz for all the controllers attached to this bus.

Referring to FIG. 5, first column 600 indicates that the port manager makes determinations of the occurrence of the slowest IO controller attached in each case. The top row indicates the number of slots populated (shortening will be discussed later). The entries in the table indicate the clock rates for the different possibilities. Therefore, reading across row two 602, if any one or all the slots are filled with 33 MHz PCI controllers the P0 port will run at 33 MHz maximum. Reading across row three 604, if three or fewer 66 MHz PCI controllers only are connected, then the port will run at 66 MHz, but if four or more 66 MHz PCI controllers are connected then the port will run at 33 MHz. From row four 606, if 66 MHz PCI-x controller populate the buss then when five or six are installed the speed of the port will be reduced to 50 MHz. Similarly for the last row 608, if one 133 MHz PCI-x controller is attached the system runs at 133 MHz, if more are attached the port speed is reduced finally to 50 MHZ if six 133 MHz PCI-x controllers are attached. In this preferred embodiment, the port speed, Port P2 of FIG. 4, is determined by the slowest device controller attached to the port IO bus. The other ports, P0, P1, and P3 operate in the same manner regarding the IO controllers attached to their IO busses.

Figure 6:
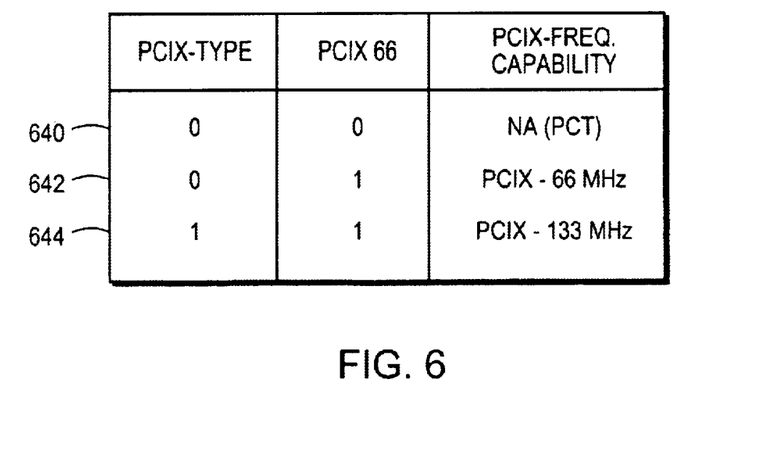
FIG. 6 is a table of device type and speeds.
Figure 7A:
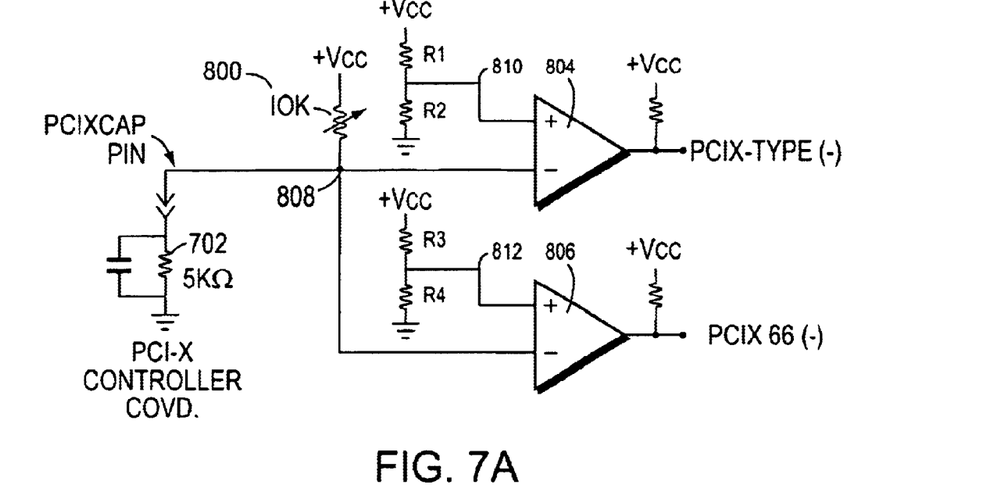
FIG. 7A is a circuit schematic diagram of portions of an embodiment.
Figure 7B:
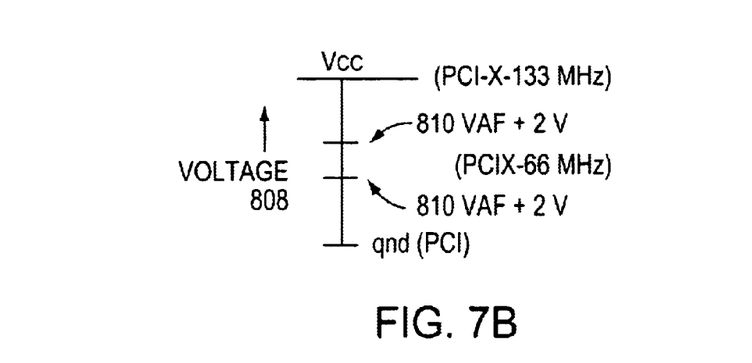
FIG. 7B is a scale of voltage levels used in FIG. 7A.

The presence and speed of PCI-x device controllers attached to a PCI-x bus (402 of FIG. 4) is determined by the termination of a pin (PCIXCAP) found on a standard PIC-x bus. PCIX-TYPE and PCIX66 signals are derived from how this pin is terminated as discussed below with reference to FIG. 7A, 7B, and 7C. The table of FIG. 6 shows the encoding of these two signals. If both are low 640 any IO device controllers connected are PCI types only. When PCIX-TYPE is low and the PCIX66 is high 642 the device controller is a PCI-x type operating ate 66 MHz. When both the PCIX and the PCIX66 are high 644, the device controller is a PCIX type operating at 133 MHz. p FIG. 7A is a schematic showing the PCIXCAP pin in a device controller being pulled down by a 10K ohm resistor 702. Since a pull down resistor cannot be directly detected by a logic circuit depending on the size of the resistor (a low resistance to ground will be detectable for some value of the low resistance). In this embodiment the resistor may be 5K or 10K ohms and such an input to a logic circuit will be indeterminate. Here the logic gate may indiscriminately toggle due to noise or leakage. In order to determine if a resistor connects this pin to ground, a current is driven into the resistor and the voltage developed is measured. In this preferred embodiment, the size of the pull down resistor is used to indicate the presence and speed of the device controller. FIG. 7A shows one detector circuit and FIG. 7B shows the voltages and the determinations. If other I/O busses and I/O controllers use different protocols, initialization programs and/or pins, as known in the art, will be programmed so that the system can determine which devices and at what speed are connected to the I/O system of the present invention.

The FIG. 7A circuit provides a pull up resistor 800, preferably 10Kohms. Installed PCI-x controller cards 802 each have a 10Kohm resistor pull down to ground which indicates that the operating frequency is 66 MHz, and the pin is unconnected when the operating frequency is 133 MHz. The comparators 804 and 806 are considered to provide a high impedance, no offset or leakage and do not affect the voltage levels at their inputs 808. For illustrative purposes consider that the Vcc is +5 V, and the resistor divider R1 and R2 provides an reference voltage 810 of +2 V to comparator 804. Also consider R3 and R4 as providing a reference voltage 812 of +1 V to comparator 806. The comparators provide an output voltage of 0 V to +5 V in concert with the relative values of the inputs. The + and − inputs to the comparators indicate the polarity of the input relative to the output signals. For example, if the + input 810 of comparator 804 is higher than the − input 808, the output of 804, PCIX-TYPE(−) will be high and visa versa. In this arrangement the PCIX-TYPE(−) and PCIX66 are negative or low when true.

Figure 7C:
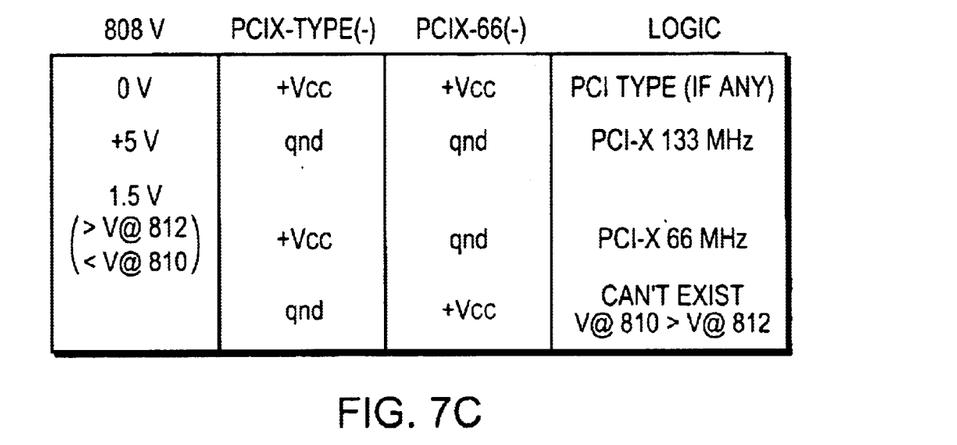
FIG. 7C is a table of speeds determined from the schematic of FIG. 7A.

So the logical determination are as shown in FIG. 7c. If input 808 is lower in voltage than either 810 and 812 outputs PCIX-TYPE and PCIX66- will both be high. This condition is illustrated in FIG. 6 row marked 640 where both PCIX-TYPE and PCIX66 are 0 or false. This may indicate that a PCI controller card is installed since a PCI may ground the PCIXCAP pin. If a PCI-x controller card is installed with an open circuited PCIXCAP, location 808 will be at +5 V which is higher than both 810 (+2 V) and 812 (+1 V), and so PCIX-TYPE(−) and PCIX66(−) both will be low and therefore true indicating a 133 MHz speed. If the PCI-x controller card installed location 808 has a 10K ohm resistor installed, location 808 will be at about +1.7 V and location 808 will be higher than location 812 but lower than location 810. Here PCIX66(−) will be low and PCIX-TYPE(−) will be high. This indicates a PCI-x operating at 66 MHz is installed. This logic can be tuned with other voltage divider levels to provide sufficient margins when other operating voltages and/or pull down resistors are used. From a practical point of view most systems are too large to operate above 66 MHz, so they have no need for hardware to differentiate any further.

During initialization the processor system places all devices in PCI-x mode or conventional mode by driving a particular combination of control signals found on pins of a PCI/PCI-x connected device at the rising edge of RST#. If the pin FRAME# is deasserted and the pin IRDY# is deasserted (i.e. the bus is idle) and one or more of the pins DEVSEL#, STOP#, and TRDY# are asserted at the rising edge of RST#, the device enters PCI-x mode. Otherwise, the device enters conventional PCI mode at the rising edge of RST#. This is referred to as the initialization pattern for PCI-x. All the above are pins of standard PCI/PCI-x connectors.

Figure 8:
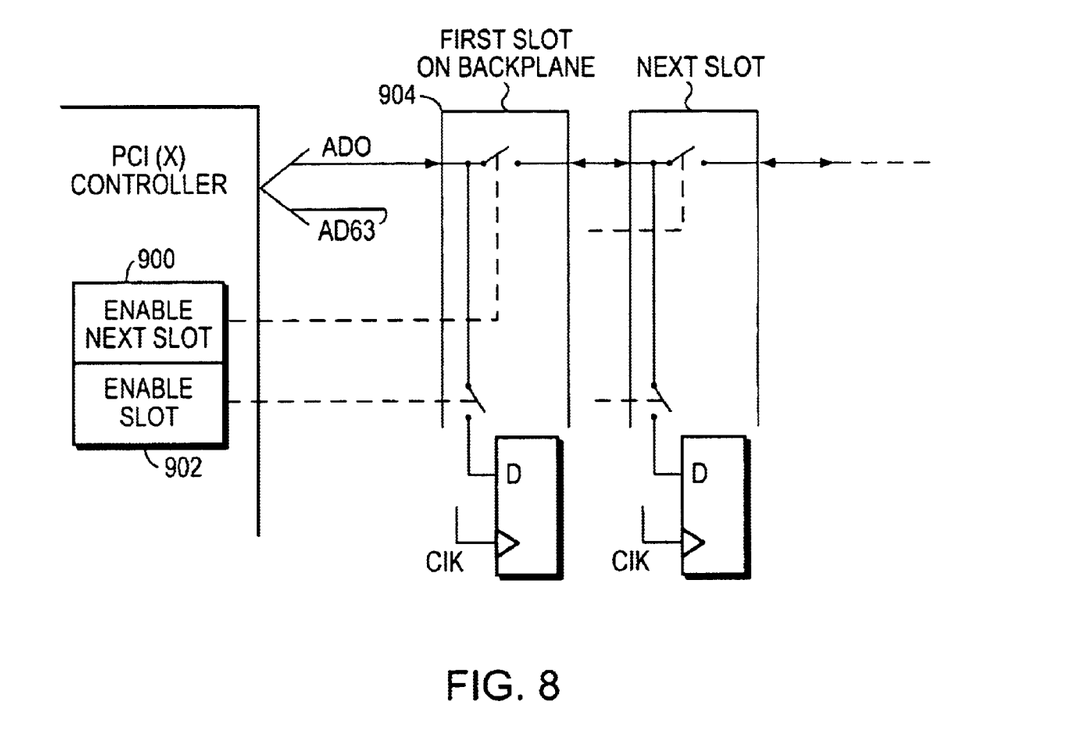
FIG. 8 is a schematic block diagram of another portion of an embodiment.

The present invention provides for shortening the bus backplane lines connecting to the IO controllers installed on a PCI-x bus. FIG. 8 shows the operation for one address/data line on a PCI-x bus. A switch in the form of a low impedance switches 900 and 902 are on the backplane at each PCI-x controller card. If there is only one PCI-x controller card installed, the physical installation (taught to the installation personnel) is in the closest slot, here shown as slot 1 904. In this condition the PCI-x controller closes switch 902 and opens switch 900, thereby ending the bus at the first slot. The effect is to have no stub that extends beyond the first slot and so avoid the ringing problem described before. If there are two PCI-x controllers both switches 900 and 902 are closed and both controller card in each slot are services by the PCI-x bus, but at the reduced speeds as shown in the speed chart of FIG. 5. The physical switches are FET transistors that provide about 0.5 ohm resistance and are packaged in groups of sixteen pairs from several well known suppliers.

What is claimed is:

1. An input-output bus manager system for connecting a variety of device controllers to a processor system, the device controllers placed on an input-output bus, the input-output bus manager comprising:

pins on the device controller wherein when the device controller is placed on the input-output bus, the pins drive corresponding pins on the input-output bus, sensing circuitry enabling the input-output controller to read the corresponding pins on the input-output bus and therefrom determines the number, location, speed, and protocol of the device controllers, in response to the determinations of number, location along the bus, speed and operating protocol of the device controllers placed on the input-output bus, means for automatically programming the length of the bus to just reach the farthest device controller, and means for automatically setting the operating speed and protocol of the bus signals to accommodate the device controllers.

2. The input-output bus manager system as defined in claim 1 wherein the means for automatically programming the length of the bus includes switches placed along the bus where the device controllers are placed, and means to activate the switches wherein the bus length does not extend beyond the last device controller attached to the bus.

3. The input-output bus manager system as defined in claim 1 further comprising means for determining the slowest device controller attached to the bus and means for operating the bus in accordance with the slowest device controller.

4. The input-output bus manager of claim 1 wherein the pins on the input-output bus are programmed using resistances ranging from a short circuit to an open circuit connected between ground and voltages available on device controller.

5. A method for accommodating a variety of device controllers to a processing system, the device controllers placed on an input-output bus, the method comprising the steps of:

programming pins on the device controller wherein, when the device controller is placed on the input-output bus, the pins drive corresponding pins on the input-output bus, sensing the corresponding pins on the input-output bus, and therefrom determining the number, location, speed, and protocol of the device, and in response to the determining, programming the length of the bus and the operating speed of the signals to the device controllers to set the bus physical length to just reach the farthest device controller, and programming the operating speed and protocol of the bus signals to accommodate the device controllers.

6. The method of claim 5 wherein the programming uses resistances ranging from a short circuit to an open circuit connected between ground and voltages available on device controller.

* * * * *